US012793337B2

(12) United States Patent
Hung et al.

(10) Patent No.: US 12,793,337 B2
(45) Date of Patent: Nov. 10, 2026

(54) METHOD OF EXTRINSIC PARAMETER OPTIMIZATION USED IN IMAGE-BASED POSE ESTIMATION AND ASSOCIATED APPARATUS AND SYSTEM

(71) Applicant: The Boeing Company, Arlington, VA (US)

(72) Inventors: Fan Hin Hung, Los Angeles, CA (US); Deepak Khosla, Camarillo, CA (US); Joshua Neighbor, Seattle, WA (US); Shawn Chamberlain, Federal Way, WA (US); Neale Ratzlaff, Los Angeles, CA (US); Tameez Latib, Calabasas, CA (US); Haden Smith, Guyton, GA (US); Leon Nguyen, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 41 days.

(21) Appl. No.: 18/524,764

(22) Filed: Nov. 30, 2023

(65) Prior Publication Data

US 2025/0182398 A1 Jun. 5, 2025

(51) Int. Cl.
*G06T 17/10* (2006.01)
*G06T 7/73* (2017.01)
*G06T 7/80* (2017.01)

(52) U.S. Cl.
CPC ................ *G06T 17/10* (2013.01); *G06T 7/74* (2017.01); *G06T 7/80* (2017.01); *G06T 2200/08* (2013.01); *G06T 2207/20084* (2013.01)

(58) Field of Classification Search
CPC .. G06T 17/10; G06T 7/80; G06T 7/74; G06T 2200/08; G06T 2207/20084
See application file for complete search history.

(56) References Cited

U.S. PATENT DOCUMENTS

| | | | |
|---|---|---|---|
| 7,980,512 | B1 | 7/2011 | Speer |
| 8,854,433 | B1 | 10/2014 | Rafii |
| 8,994,723 | B2 | 3/2015 | Drost et al. |

(Continued)

FOREIGN PATENT DOCUMENTS

| | | | |
|---|---|---|---|
| CN | 110097574 | | 8/2019 |
| EP | 3566949 | A1 | 11/2019 |

(Continued)

OTHER PUBLICATIONS

Extended European Search Report for EP Patent Application No. 24192391.1 dated Jan. 24, 2025, pp. 1-13.

(Continued)

*Primary Examiner* — Abderrahim Merouan
(74) *Attorney, Agent, or Firm* — Massey Bean & Lewis

(57) ABSTRACT

Methods, apparatuses and systems for extrinsic parameter optimization used in image-based pose estimation of a boom are disclosed. The method includes generating a 3D model of the boom, generating 3D keypoints using the generated 3D model of the object (206) and generating predicted 2D keypoints from the generated 3D keypoints and at least one initial extrinsic parameter. The value of the initial extrinsic parameter is optimized using an iterative process such that the variation between the predicted 2D keypoints and location of the boom is minimized.

20 Claims, 6 Drawing Sheets

(56) References Cited

U.S. PATENT DOCUMENTS

| | | | |
|---|---|---|---|
| 9,150,310 B1 | 10/2015 | Bray et al. | |
| 10,565,731 B1 | 2/2020 | Reddy | |
| 10,909,715 B1 | 2/2021 | Boggs | |
| 10,929,654 B2 | 2/2021 | Iqbal | |
| 10,937,189 B2 | 3/2021 | Li et al. | |
| 11,254,440 B2 * | 2/2022 | Ropers | G06T 7/70 |
| 11,459,116 B2 | 10/2022 | Kyono et al. | |
| 11,748,913 B2 | 9/2023 | Ali et al. | |
| 11,827,203 B2 | 11/2023 | Chakravarty et al. | |
| 11,880,503 B1 | 1/2024 | Haentjens | |
| 12,139,271 B2 | 11/2024 | Khosla | |
| 2007/0023575 A1 | 2/2007 | von Thal | |
| 2017/0073080 A1 | 3/2017 | Hughes | |
| 2018/0173839 A1 | 6/2018 | Fang | |
| 2018/0178924 A1 | 6/2018 | Zomeno Rodríguez | |
| 2019/0031347 A1 | 1/2019 | Duan | |
| 2019/0344902 A1 | 11/2019 | Cramblitt | |
| 2019/0355150 A1 * | 11/2019 | Tremblay | G06T 7/73 |
| 2019/0382126 A1 | 12/2019 | Rix et al. | |
| 2020/0217666 A1 | 7/2020 | Zhang | |
| 2020/0226426 A1 | 7/2020 | Jarquin Arroyo | |
| 2021/0117661 A1 | 4/2021 | Iqbal | |
| 2021/0304438 A1 | 9/2021 | Ye | |
| 2021/0314551 A1 | 10/2021 | Tang | |
| 2022/0075994 A1 | 3/2022 | Shapira et al. | |
| 2022/0108468 A1 | 4/2022 | Nakamura | |
| 2022/0212811 A1 * | 7/2022 | Khosla | G06V 10/46 |
| 2022/0215571 A1 | 7/2022 | Leach | |
| 2022/0258875 A1 | 8/2022 | Kyono | |
| 2022/0276652 A1 | 9/2022 | Kyono et al. | |
| 2022/0277472 A1 | 9/2022 | Birchfield et al. | |
| 2022/0292772 A1 | 9/2022 | Wang | |
| 2022/0306311 A1 | 9/2022 | Kyono | |
| 2022/0413119 A1 * | 12/2022 | Starr | G01S 7/4808 |
| 2022/0414911 A1 * | 12/2022 | Wang | G06T 17/00 |
| 2023/0244835 A1 | 8/2023 | Guo | |
| 2023/0244905 A1 | 8/2023 | Zoldi | |
| 2023/0281864 A1 | 9/2023 | Guo | |
| 2023/0281945 A1 | 9/2023 | Cashman | |
| 2024/0375786 A1 | 11/2024 | Hung et al. | |
| 2024/0378744 A1 | 11/2024 | Smith et al. | |
| 2024/0391494 A1 | 11/2024 | Rosenblum et al. | |
| 2025/0011002 A1 | 1/2025 | Latib et al. | |
| 2025/0022157 A1 | 1/2025 | Latib et al. | |
| 2025/0164944 A1 | 5/2025 | Oyama | |
| 2025/0171159 A1 | 5/2025 | Hung et al. | |
| 2025/0173575 A1 | 5/2025 | Hung et al. | |
| 2025/0173897 A1 | 5/2025 | Hung et al. | |
| 2025/0173898 A1 | 5/2025 | Hung et al. | |
| 2025/0182398 A1 * | 6/2025 | Hung | G06T 17/10 |
| 2025/0190906 A1 | 6/2025 | Yin | |

FOREIGN PATENT DOCUMENTS

| | | |
|---|---|---|
| EP | 4024340 | 7/2022 |
| EP | 4024346 | 7/2022 |
| WO | 2025003634 | 1/2025 |

OTHER PUBLICATIONS

Extended European Search Report for EP Patent Application No. 24192395.2 dated Jan. 24, 2025, pp. 1-12.

Li et al., Deep Supervision with Intermediate Concepts, IEEE Transactions on Pattern Analysis and Machine Intelligence, Aug. 2019, pp. 1828-1843, vol. 41, No. 8.

Reddy et al.,. Occlusion-Net: 2D/3D Occluded Keypoint Localization Using Graph Networks, 2019, IEEE/CVF Conference on Computer Vision and Pattern Recognition, pp. 7318-7327, IEEE Computer Society.

Park et al., Robust multi-task learning and online refinement for spacecraft pose estimation across domain gap, 2023, pp. 1-15, Advances in Space Research.

Gong et al., Research of an Unmanned Aerial Vehicle Autonomous Aerial Refueling Docking Method Based on Binocular Vision, 2023, pp. 1-21, 7, 433.

Morreale et al., Neural Semantic Surface Maps, Sep. 9, 2023, pp. 1-15.

Reed, Benjamin B., The Restore-L Servicing Mission, Mar. 29, 2016, pp. 1-32, retrieved from URL:https://www.nasa.gov/wp-content/uploads/2015/03/reed_restorel_tagged.pdf Jan. 14, 2025.

Extended European Search Report for EP Patent Application No. 24171550.7 dated Oct. 16, 2024, pp. 1-13.

Gupta, et al., "CullNet: Calibrated and Pose Aware Confidence Scores for Object Pose Estimation", 2019 IEEE/CVF International Conference on Computer Vision Workshop (ICCVW), IEEE, Oct. 27, 2019, pp. 2758-2766.

Klein, et al., "Uncertainty in Data-Driven Kalman Filtering for Partially Known State-Space Models", ICASSP 2022—2022 IEEE International Conference on Acoustics, Speech, and Signal Processing (ICASSP), IEEE, May 23, 2022, pp. 3194-3198.

Shi, et al., "Fast Uncertainty Quantification for Deep Object Pose Estimation", Arvix.org, Cornell University Library, Nov. 16, 2020, pp. 1-8.

Teng Chin-Hung, "Enhanced Outlier Removal for Extended Kalman Filter based Visual Inertial Odometry", 2018 IEEE International Conference on Applied System Innovation (ICASI), IEEE, Apr. 13, 2018, pp. 74-77.

Extended European Search Report for EP Patent Application No. 24182647.8 dated Oct. 24, 2024, pp. 1-7.

Extended European Search Report for EP Patent Application No. 24183945.5 dated Nov. 20, 2024, pp. 1-8.

Lee, et al., "Long-Range Pose Estimation for Aerial Refueling Approaches Using Deep Neural Networks", Journal of Aerospace Information Systems, vol. 17, No. 11, Nov. 1, 2020, pp. 634-646.

Thomas, et al., "Advances in air to air refuelling", Progress in Aerospace Sciences, vol. 71, Jul. 28, 2014, pp. 14-35.

Extended European Search Report for EP Patent Application No. 24200751.6 dated Mar. 7, 2025.

Dementhon, et al., Model-Based Object Pose in 25 Lines of Code, pp. 1-9.

Extended European Search Report for EP Patent Application No. 24196940.1 dated Mar. 7, 2025.

Wang et al., Revisiting Monocular Satellite Pose Estimation With Transformer, IEEE Transactions on Aerospace and Electronic Systems, Oct. 2022, pp. 4279-4294, vol. 58, No. 5.

Chen et al., Satellite Pose Estimation with Deep Landmark Regression and Nonlinear Pose Refinement, Computer Vision Foundation, 2019, pp. 1-9.

Quang et al., Monocular Vision and Machine Learning for Pose Estimation, 2023, pp. 128-136.

Extended European Search Report for EP Patent Application No. 24196935.1 dated Feb. 6, 2025.

Shi et al., Fast Uncertainty Quantification for Deep Object Pose Estimation, IEEE International Conference on Robotics and Automation, May 2021, pp. 5200-5207.

Vaghi et al., A Comparison of Uncertainty Estimation Approaches for DNN-based Camera Localization, Nov. 2022, pp. 1-7.

Zhao, et al., "Estimating 6D Pose From Localizing Designated Surface Keypoints", https://arxiv.org/pdf/1812.01387.pdf, accessed Dec. 5, 2023, pp. 1-9.

Xiao et al., "Simple Baselines for Human Pose Estimation and Tracking", https://arxiv.org/pdf/1804.06208.pdf, accessed Dec. 5, 2023, pp. 1-9.

Suwajanakorn, et al., "Discovery of Latent 3D Keypoints via End-to-end Geometric Reasoning", https://keypointnet.github.io/keypointnet_neurips.pdf, accessed Dec. 5, 2023, pp. 1-12.

Lee, et al., "Camera-to-Robot Pose Estimation from a Single Image", 2020 IEEE International Conference on Robotics and Automation (ICRA), 2020, pp. 9426-9432, Paris, France.

Bashir, et al., "Small Object Detection in Remote Sensing Images with Residual Feature Aggregation-Based Super-Resolution and Object Detector Network", Remote Sens., 2021, 13, 1854, pp. 1-21.

Unel, et al., "The Power of Tiling for Small Object Detection", Computer Vision Foundation, pp. 1-10.

(56) References Cited

OTHER PUBLICATIONS

Lee, et al., "Online Extrinsic Camera Calibration for Temporally Consistent IPM Using Lane Boundary Observations with a Lane Width Prior", https://arxiv.org/pdf/2008.03722.pdf, accessed Dec. 5, 2023, pp. 1-6.
Zhang, et al., "A Flexible Online Camera Calibration Using Line Segments", Journal of Sensors, 2016, vol. 2016, Article ID 2802343, pp. 1-17, Hindawi Publishing Corporation.
Liu et al., Simple and Principled Uncertainty Estimation with Deterministic Deep Learning via Distance Awareness, 34th Conference on Neural Information Processing Systems, 2020, pp. 1-15, Vancouver, CA.
Guo et al., On Calibration of Modern Neural Networks, Proceedings of the 34th International Conference on Machine Learning, Aug. 3, 2017, pp. 1-14, Sydney, Australia.
Pavlakos, et al., 6-DoF Object Pose from Semantic Keypoints, 2017 IEEE Internation Conference on Robotics and Automation, pp. 1-8.
Extended European Search Report for EP Patent Application No. 24165111.6 dated Jul. 10, 2024.
Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024.
Extended European Search Report for EP Patent Application No. 21205493.6 dated Mar. 31, 2022.
Doebbler, et al., "Boom and Receptacle Autonomous Air Refueling Using Visual Snake Optical Sensor", Journal of Guidance and Control and Dynamics, Nov. 1, 2007, pp. 1753-1769, vol. 30, No. 6.
Anderson, et al., "Augmenting Flight Imagery from Aerial Refueling", Oct. 21, 2019, Computer Vision—ECCV 2020 : 16th European Conference, Glasgow, UK, Aug. 23-28, 2020, pp. 154-165, Proceedings; [Lecture Notes in Computer Science ; ISSN 0302-9743], Springer International Publishing, Cham.
Soujanya, et al. "Addressing corner detection issues for machine vision based UAV aerial refueling" Machine Vision and Applications, Springer, Jan. 10, 2007, pp. 261-276, vol. 18, No. 5, Berlin, DE.
Duan, et al., "Visual Measurement in Simulation Environment for Vision-Based UAV Autonomous Aerial Refueling", IEEE Transactions on Instrumentation and Measurement, IEEE, USA, Sep. 1, 2015, pp. 2468-2480, vol. 64, No. 9, USA.
Cui, et al., "Visual Servoing of a Flexible Aerial Refueling Boom With an Eye-in-Hand Camera", IEEE Transactions on Systems, Man, and Cybernetics: Systems, IEEE, Jan. 8, 2020, pp. 6282-6292, vol. 51, No. 10, Piscataway, NJ, USA.
Lakshminarayanan, et al. "Simple and Scalable Predictive Uncertainty Estimation using Deep Ensembles", 31st Conference on Neural Information Processing Systems (NIPS 2017), 2017, pp. 1-15, Long Beach, CA, USA.
Shen, et al., "Real-Time Uncertainty Estimation in Computer Vision via Uncertainty-Aware Distribution Distillation", Computer Vision Foundation, 2021, pp. 707-716.
Peng, et al., "PVNet: Pixel-wise Voting Network for 6DoF Pose Estimation", Computer Vision Foundation, pp. 4561-4570.
Brachmann, et al., "Uncertainty-Driven 6D Pose Estimation of Objects and Scenes from a Single RGB Image", Computer Vision Foundation, pp. 3364-3372.
Rasmussen, C.E., "Gaussian Processes in Machine Learning", Max Planck Institute for Biological Cybernetics, pp. 63-71, Tubingen, Germany.
Romano, et al., "Conformalized Quantile Regression", 33rd Conference on Neural Information Processing Systems, 2019, pp. 1-11, Vancouver, Canada.
Ratzlaff, et al. "Generative Particle Variational Inference via Estimation of Functional Gradients", Proceedings of the 38 th International Conference on Machine, 2021, pp. 1-22.
Tobin et al., "Domain Randomization for Transferring Deep Neural Networks from Simulation to the Real World", https://arxiv.org/pdf/1703.06907.pdf, accessed Dec. 5, 2023, pp. 1-8.
Mehta, et al. "Active Domain Randomization", https://arxiv.org/pdf/1904.04762.pdf, accessed Dec. 5, 2023, pp. 1-15.
Akkaya et al., "Solving Rubik's Cube With a Robot Hand", https://arxiv.org/pdf/1910.07113.pdf, accessed Dec. 5, 2023, pp. 1-51.
Parsons et al., Analysis of Simulated Imagery for Real-Time Vision-Based Automate Aerial Refueling, Journal of Aerospace Information Systems, Mar. 2019, pp. 77-93, vol. 16, No. 3.
Newell et al., Stacked Hourglass Networks for Human Pose Estimation, Jul. 2016, pp. 1-17, article obtain from https://arxiv.org/pdf/1603.06937 Sep. 16, 2025.
Fu, et al. "The 60 pose estimation of the aircraft using geometric property." IEEE Transactions on Circuits and Systems for Video Technology, Jul. 2023, pp. 3358-3368, vol. 33, No. 7.
Hashemi, M., "Enlarging smaller images before inputting into convolutional neural network: zero-padding vs. interpolation." Journal of Big Data, 2019, pp. 1-13.
Saponara, et al. Impact o Image Resizing on Deep Learning Detectors for Training Time and Model Performance, Department of Information Engineering, University of Pisa, Italy, 2022, pp. 10-17.
EP Office Action for EP Patent Application No. 24182647.8 dated Mar. 17, 2026.
Hao et al., Scale-unambiguous relative pose estimation of space uncooperative targets based on the fusion of three- dimensional time-of-flight camera and monocular camera, Optical Engineering, May 2015, pp. 053112-1 to 053112-12, vol. 54, issue 5.
Wang et al., Normalized Object Coordinate Space for Category-Level 6D Object Pose and Size Estimation, 2019, pp. 2637-2646, 2019 IEEE/CVF Conference on Computer Vision and Pattern Recognition.
Fornalczyk et al., Robust Face Model Based Approach to Head Pose Estimation, 2017, pp. 1291-1295, Proceedings of hte Federated Conference on Computer Science ad Information Systems, vol. 11.
Oksuz et al., "Imbalance Problems in Object Detection: A Review," Mar. 11, 2020, accessed https://arxiv.org/abs/1909.00169 on Jul. 14, 2026.
Dao et al., "A Kernel Theory of Modern Data Augmentation," Mar. 21. 2019, accessed https://arxiv.org/pdf/1803.06084 on Jul. 14, 2026.

* cited by examiner

METHOD OF EXTRINSIC PARAMETER OPTIMIZATION USED IN IMAGE-BASED POSE ESTIMATION AND ASSOCIATED APPARATUS AND SYSTEM

FIELD

This disclosure relates generally to image-based pose prediction, and more particularly to optimizing parameters used in image-based pose prediction techniques.

BACKGROUND

Image-based pose prediction techniques use two dimensional images to determine three-dimensional coordinates of a three-dimensional model. One such method uses a computer vision pipeline to estimate the pose of the three-dimensional model. Examples of a three-dimensional model include a robotic arm and a refueling boom of an aircraft. Using computer vision methods, images captured from a camera can be used to estimate the three-dimensional positions and orientations (poses) of the model. The estimated positions and orientations may be accurate enough for some applications.

However, more accurate estimation and robust control is achievable if the estimation process includes a kinematic model of the three-dimensional model. The kinematic model details joint angles and connections and accurately represents the way that the three-dimensional model can move according to control angles. It allows sensor fusion and more constrained estimation of the three-dimensional model's position. To use this kinematic model, the offset between the mount point of the camera that captures the two-dimensional images and the mount point of the three-dimensional model are needed. The offsets includes an orientation offset as well as a positional offset and may be referred to as the extrinsic parameters of the camera. The offset may be taken from manufacturing or assembly schematics. Variance between the offset in the schematics and actual construction, may cause errors in estimation of the pose. In situations where the camera and three-dimensional model are subject to elements, or where the camera or three-dimensional model may be serviced during operation, further variation may be introduced between the offset in the schematics and actual offset. In the example of a refueling boom, there may be various variances introduced after the installation of the boom and camera. Further, due to the nature of the application, a high degree of precision is required to control the boom. Therefore, there is a need for a new method to estimate the variation in the offset to achieve the most accurate control of the boom based on estimation of the boom position from two-dimensional images.

SUMMARY

The subject matter of the present application has been developed in response to the present state of the art, and in particular, in response to the problems of and needs created by, or not yet fully solved by, extrinsic parameter optimization in image-based pose estimation techniques. Generally, the subject matter of the present application has been developed to provide a method of extrinsic parameter optimization in image-based pose estimation that overcomes at least some of the above-discussed shortcomings of prior art techniques.

The following portion of this paragraph delineates example 1 of the subject matter, disclosed herein. According to example 1, a vision-based optimization apparatus includes a camera fixed relative to an object, at least one processor, and a memory device storing instructions. When the instructions are executed by the at least one processor they cause the at least one processor to at least receive a two-dimensional (2D) image of at least a portion of the object via the camera, generate 3D keypoints using a 3D model of the object and known rotational and translational information of the object, generate predicted 2D keypoints based at least in part on the generated 3D keypoints and at least one initial extrinsic parameter, compare the predicted 2D keypoints and the 2D image to generate a feedback value, and based on the feedback value, update the at least one initial extrinsic parameter to generate an at least one updated initial extrinsic parameter.

The following portion of this paragraph delineates example 2 of the subject matter, disclosed herein. According to example 2, which encompasses example 1, above, the instructions further cause the at least one processor to generate a second set of predicted 2D keypoints based at least in part on the at least one updated extrinsic parameter, compare the updated predicted 2D keypoints and the 2D image to update the feedback value, and based on the updated feedback value, update the at least one updated initial extrinsic parameter.

The following portion of this paragraph delineates example 3 of the subject matter, disclosed herein. According to example 3, which encompasses any one of examples 1-2, above, the apparatus further includes a boom control system. The instructions cause the at least one processor to receive the known rotational and translational information of the object from the boom control system.

The following portion of this paragraph delineates example 4 of the subject matter, disclosed herein. According to example 4, which encompasses any one of examples 1-3, above, the instructions further cause the at least one processor to utilize a neural network system to generate the predicted 2D keypoints.

The following portion of this paragraph delineates example 5 of the subject matter, disclosed herein. According to example 5, which encompasses any one of examples 1-4, above, the at least one initial extrinsic parameter comprises of at least one of an offset of the camera along an x-axis relative to a first setpoint, an offset of the camera along a y-axis relative to the first setpoint, an offset of the camera along a z-axis relative to the first setpoint, a pitch offset of the camera relative to the first setpoint, a yaw offset of the camera relative to the first setpoint, a roll offset of the camera relative to the first setpoint.

The following portion of this paragraph delineates example 6 of the subject matter, disclosed herein. According to example 6, which encompasses example 5, above, the object comprises a refueling boom of an aircraft.

The following portion of this paragraph delineates example 7 of the subject matter, disclosed herein. According to example 7, which encompasses any one of examples 5-6, above, the at least one initial extrinsic parameter corresponds with an estimated offset between the camera and the first setpoint, and wherein the first setpoint is an estimated location of the camera.

The following portion of this paragraph delineates example 8 of the subject matter, disclosed herein. According to example 8, a computer implemented method of optimizing a vision-based system to control an object includes receiving a two-dimensional (2D) image of at least a portion of the object via a camera. The method also includes generating a 3D model of the object, generating 3D keypoints using the 3D model of the object, generating predicted 2D keypoints based at least in part on the generated 3D keypoints and at least one initial extrinsic parameter, determining a feedback value, based at least in part on the predicted 2D keypoints and the 2D image to generate a feedback value, using an optimizer to minimize the feedback value and to generate a minimized feedback value, and obtaining at least one optimized extrinsic parameter based on the minimized feedback value.

The following portion of this paragraph delineates example 9 of the subject matter, disclosed herein. According to example 9, which encompasses example 8, above, generating the predicted 2D keypoints is based at least in part on the generated 3D keypoints and at least one initial extrinsic parameter is generated by a neural network system.

The following portion of this paragraph delineates example 10 of the subject matter, disclosed herein. According to example 10, which encompasses example 9, above, the computer implemented method further includes training the neural network system based at least in part on image data from camera, and the 3D model of the object, based at least in part on obtained position and rotational information the object.

The following portion of this paragraph delineates example 11 of the subject matter, disclosed herein. According to example 11, which encompasses any one of examples 8-10, above, the computer implemented method further includes obtaining position and rotational information of the object. Generating the 3D model of the object is based at least in part on the obtained position, rotational, and joint angle information.

The following portion of this paragraph delineates example 12 of the subject matter, disclosed herein. According to example 12, which encompasses any one of examples 8-11, above, using the optimizer to minimize the feedback value further comprises using an objective function, based at least in part on the feedback value and the at least one initial extrinsic parameter and iteratively using the optimizer to minimize the feedback value, and, as the feedback value is reduced, the at least one initial extrinsic parameter is optimized.

The following portion of this paragraph delineates example 13 of the subject matter, disclosed herein. According to example 13, which encompasses example 12, above, the computer implemented method further includes using the at least one optimized extrinsic parameter as input to determine a plurality of 3D keypoints of the object based on a second two-dimensional (2D) image of at least a portion of the object.

The following portion of this paragraph delineates example 14 of the subject matter, disclosed herein. According to example 14, which encompasses any one of examples 8-13, above, the at least one initial extrinsic parameter comprises of at least one of an offset of the camera along an x-axis relative to a first setpoint, an offset of the camera along a y-axis relative to the first setpoint, an offset of the camera along a z-axis relative to the first setpoint, a pitch offset of the camera relative to the first setpoint, a yaw offset of the camera relative to the first setpoint, and a roll offset of the camera relative to the first setpoint.

The following portion of this paragraph delineates example 15 of the subject matter, disclosed herein. According to example 15, which encompasses any one of examples 8-14, above, the object comprises a refueling boom of an aircraft.

The following portion of this paragraph delineates example 16 of the subject matter, disclosed herein. According to example 16, a non-transitory computer-readable medium storing instructions, which when executed by a processor, cause the processor to receive a two-dimensional (2D) image of at least a portion of an object via a camera, generate a 3D model of the object, generate 3D keypoints using the 3D model of the object, generate predicted 2D keypoints based at least in part on the generated 3D keypoints and at least one initial extrinsic parameter, determine a feedback value, based at least in part on the predicted 2D keypoints and the 2D image to generate a feedback value, use an optimizer to minimize the feedback value and to generate a minimized feedback value, and obtain at least one optimized extrinsic based on the minimized feedback value.

The following portion of this paragraph delineates example 17 of the subject matter, disclosed herein. According to example 17, which encompasses example 16, above, the instructions further cause the processor to utilize a neural network system to generate the predicted 2D keypoints.

The following portion of this paragraph delineates example 18 of the subject matter, disclosed herein. According to example 18, which encompasses any one of examples 16-17, above, the instructions further cause the processor to train the neural network system based at least in part on image data from camera, the 3D model of the object, based at least in part on obtained positional, rotational, and joint angle information the object.

The following portion of this paragraph delineates example 19 of the subject matter, disclosed herein. According to example 19, which encompasses any one of examples 16-18, above, the instructions further cause the processor to obtain position and rotational information of the object. Generating the 3D model of the object is based at least in part on the obtained position and rotational information.

The following portion of this paragraph delineates example 20 of the subject matter, disclosed herein. According to example 20, which encompasses any one of examples 16-19, above, using the optimizer to minimize the feedback value further includes using an objective function, based at least in part on the feedback value and the at least one initial extrinsic parameter and iteratively using the optimizer to minimize the feedback value, and as the feedback value is reduced, the at least one initial extrinsic parameter is optimized.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples. Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Disclosed herein are examples of methods, systems, and apparatuses of extrinsic parameter optimization used in image-based pose estimation.

Figure 1:
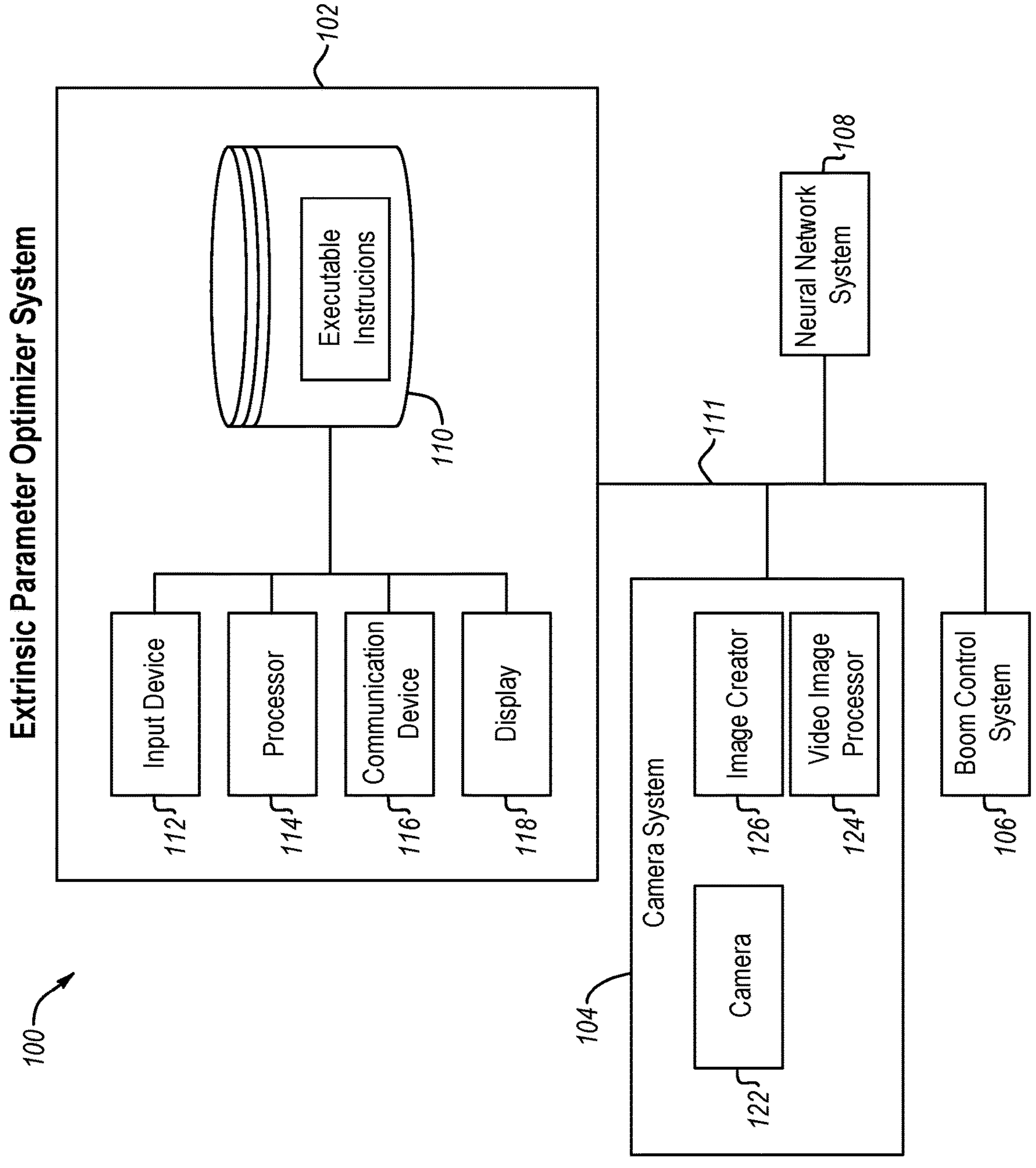
FIG. 1 is a block diagram illustrating a system for extrinsic parameter optimization used in image-based pose estimation, according to one or more examples of the present disclosure.

Referring to FIG. 1, one example of an image-based pose estimation system 100 is shown. The image-based pose estimation system 100 includes extrinsic parameter optimization system 102, camera system 104, boom control system 106 and neural network system 108, all via data communication channel 111. Extrinsic parameter optimization system 102 includes memory 110, input device 112, processor 114, communication device 116, and display 118. In some examples, non-transitory computer readable instructions (i.e., code) stored in memory 110 (i.e., storage media) cause the processor 114 to execute operations, such as the operations in extrinsic parameter optimization system 102. In certain examples, neural network system 108 is included with extrinsic parameter optimizer system 102.

In various examples, camera system 104 includes camera 122 (or cameras), video image processor 124, and image creator 126. Camera 122 is any device capable of capturing images or video and includes a lens or lenses which, in some examples, may have remotely operated focus and zoom capabilities. Video image processor 124 is configured to process the images or video captured by camera 122, and may adjust focus, zoom, and/or perform other operations to improve the image quality. Image creator 126 assembles the processed information from video image processor 124 into a final image or representation which can be used for various purposes. In certain of these examples, camera system 104 includes a system to control the orientation of camera 122. For example, camera 122 may be rotated around the x, y, or z axis to better orient camera 122.

In various examples, boom control system 106 operates to control movement of a refueling boom of an aircraft. In some examples, boom control system 106 includes a control system to control the mechanical movements of the various controllers of the refueling boom. The control system receives an input signal that correlates to movement within a coordinate system, such as an amount of movement along an x, y, or z axis relative to a frame of reference, or an angular movement of one or more joints of the refueling boom. In one example, the control system receives instructions from another system. In some examples, boom control system 106 also includes sensors that detect the movement and position of the boom and report the signal to another system such as extrinsic parameter optimizer system 102. In some examples, boom control system 106 also includes an input device to manually control the movement of the refueling boom.

Image-based pose estimation system 100 also includes neural network system 108. Neural network system 108 operates to estimate a position of the refueling boom based on two-dimensional images from the refueling boom. In some examples, these two-dimensional images are obtained via camera system 104. In various examples, neural network system 108 is trained on a quantity of images of refueling boom to fine tune its performance.

Figure 2:
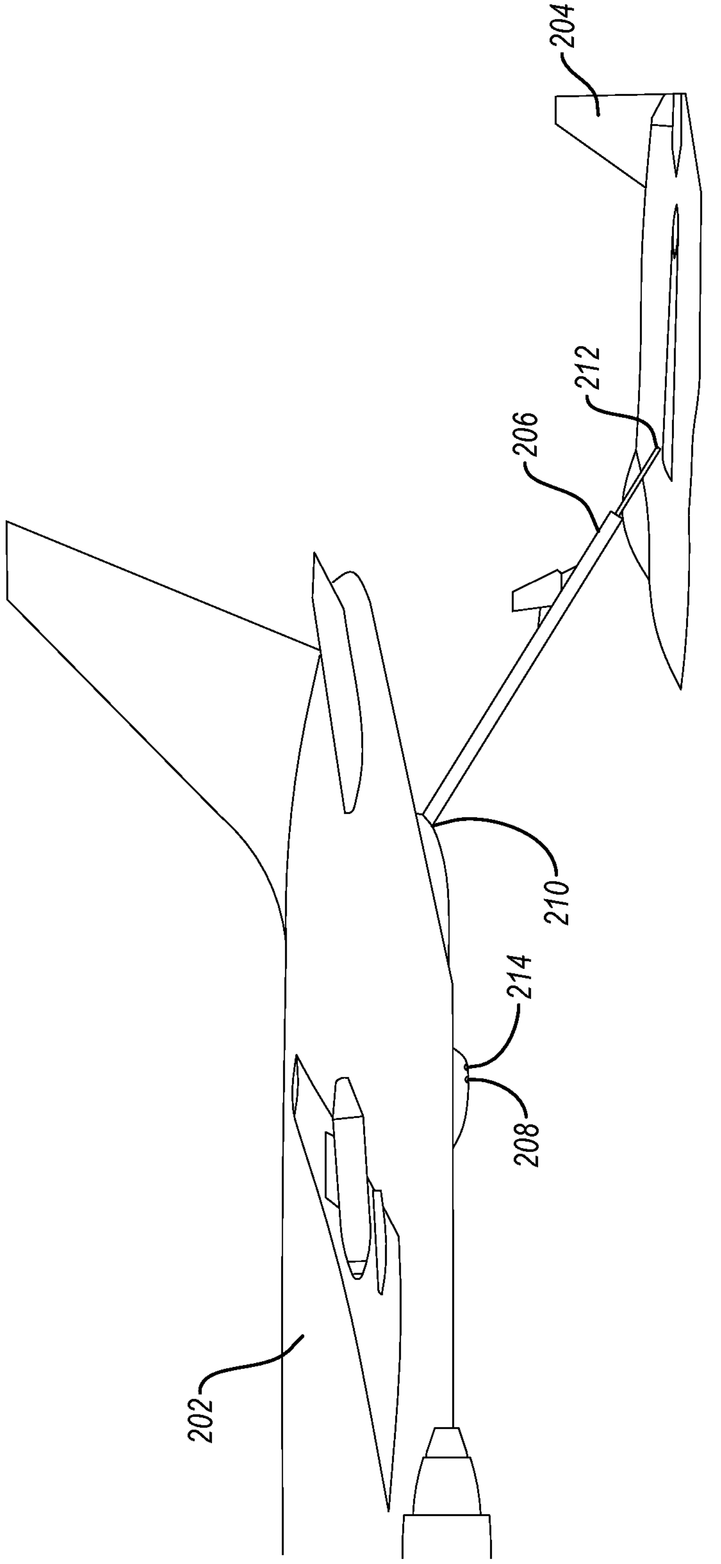
FIG. 2 is a side view of a refueling boom of an aircraft that utilizes a system for extrinsic parameter optimization used in image-based pose estimation, according to one or more examples of the present disclosure.

FIG. 2 is a view of showing a refueling boom of an aircraft that utilizes a system for extrinsic parameter optimization used in image-based pose estimation, according to one or more examples of the present disclosure. Refueling aircraft 202 and receiving aircraft 204 are shown in FIG. 2. Refueling boom 206 is shown extended to refuel receiving aircraft 204. Image capture device 208 is mounted on refueling aircraft 202. In some examples, image capture device 208 is part of camera system 104. In one example, image capture device 208 is the same as camera 122. Various types of image capture devices, such as camera, infrared capture device, ultrasonic image acquisition device, etc., may be used. In various examples, image capture device 208 is mounted at a position on refueling aircraft such that it has a clear view of refueling boom 206 and receiving aircraft 204. In various examples, the offset between image capture device 208 and mounting location 210 of refueling boom 206 is based on specifications of aircraft 202. The actual offset between image capture device 208 and mounting location 210 may vary in actual operation of aircraft 202 as the actual mount point 214 of image capture device 208 may not match the intended mount point of image capture device 208. For example, during servicing of image capture device 208 or refueling boom 206, there may be a shift in the offset. Offset refers to the linear offset in the x, y, or z direction as well as an angular offset in orientation. Also shown in FIG. 2 is end point 212 of refueling boom 206. End point 212 of refueling boom 206 is the part that attaches to receiving aircraft 204 to initiate a refueling operation.

Figure 3:
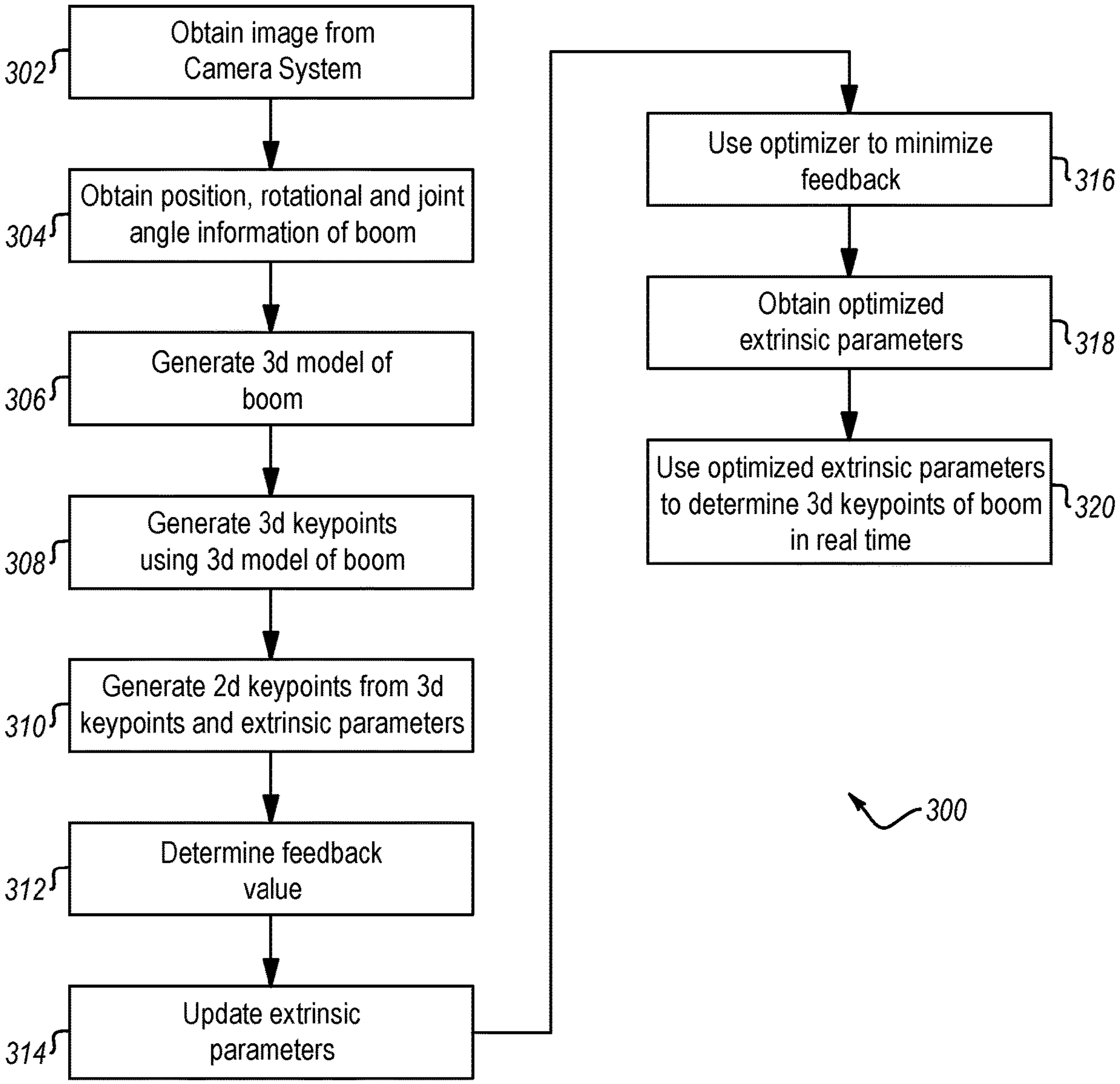
FIG. 3 is a flow diagram of a method of extrinsic parameter optimization used in image-based pose estimation, according to one or more examples of the present disclosure

Referring to FIG. 3, a flow diagram of a method 300 of extrinsic parameter optimization used in image-based pose estimation, according to one or more examples of the present disclosure, is shown. At block 302 of method 300, extrinsic parameter optimizer system 102 obtains an image from camera system 104. The image shows refueling boom 206. In one example, the image is stored in memory 110. At block 304 of method 300, extrinsic parameter optimizer system 102 obtains position, rotational and joint angle information of refueling boom 206. In one or more examples, this information is obtained from boom control system 106. In some of these examples, this information includes x, y, and z coordinates of a particular location on refueling boom 206, such as end point 212. In some of these examples, the position is relative to mounting location 210. In some examples, the position includes an orientation of end point 212. In some examples, the joint angle information includes angles of various joints with other joints of refueling boom 206.

At block 306 of method 300, extrinsic parameter optimizer system 102 generates a three-dimensional model of refueling boom 206. The three-dimensional model is generated based on known kinematic model of refueling boom 206. The known kinematic model is stored in memory 110 and includes information such as dimensions of various linkages of refueling boom 206, any constraints on movement of these linkages, joint angles, and any other information needed to generate the three-dimensional model. Based on the known kinematic model, extrinsic parameter optimizer system 102 is configured to accurately generate the way refueling boom 206 moves in a three-dimensional space such that end point 212 reaches a known position in three-dimensional space, which corresponds to the obtained positional and rotational information of end point 212 of refueling boom 206. In one example, extrinsic parameter optimizer system 102 uses an iterative process to cycle through various joint angles until it obtains a combination that will result in the generated location of end point 212 coinciding with the obtained location of end point 212. In another example, neural network system 108 is used to generate the three-dimensional model. In this example, neural network system 108 uses training data that includes various joint angles and locations of end point 212 of refueling boom 206. This training data is then used to determine the three-dimensional model of refueling boom 206 based on the obtained location of end point 212. In another example, extrinsic parameter optimizer system 102 starts with a known three-dimensional model of refueling boom 206 at a preset location and then uses control parameters (known movement of refueling boom 206) to determine the three-dimensional model.

At block 308 of method 300, extrinsic parameter optimizer system 102 generates three-dimensional keypoints using the determined three-dimensional model of refueling boom 206. In certain examples, the keypoints are preselected to match certain points on refueling boom 206. In some of these examples, the selected keypoints correspond to end point 212. In certain examples, the selected keypoints correspond to positions on refueling boom 206 that will be included in an image capture of refueling boom 206 from image capture device 208. In other words, an image captured by image capture device 208 of refueling boom 206 does not show the entire refueling boom 206, but only a specific portion of refueling boom 206. The selected keypoints correspond to points on that specific portion of refueling boom 206. In certain examples, the keypoints are determined by extrinsic parameter optimizer system 102 to identify certain shape parameters of refueling boom 206.

In certain examples, extrinsic parameter optimizer system 102 determines the keypoints based on the determined three-dimensional model of refueling boom 206. In other words, once extrinsic parameter optimizer system 102 determines the three-dimensional model of refueling boom 206, it then determines the location of the keypoints in the three-dimensional space. Extrinsic parameter optimizer system 102 also stores the location of the keypoints in a neutral pose of refueling boom 206 and then determines their location based on the difference in the current pose and the neutral pose of refueling boom 206. Since the keypoints are locations on refueling boom 206 and extrinsic parameter optimizer system 102 knows the three-dimensional model of refueling boom 206, it also can determine the three-dimensional location of these keypoints.

Figure 4:
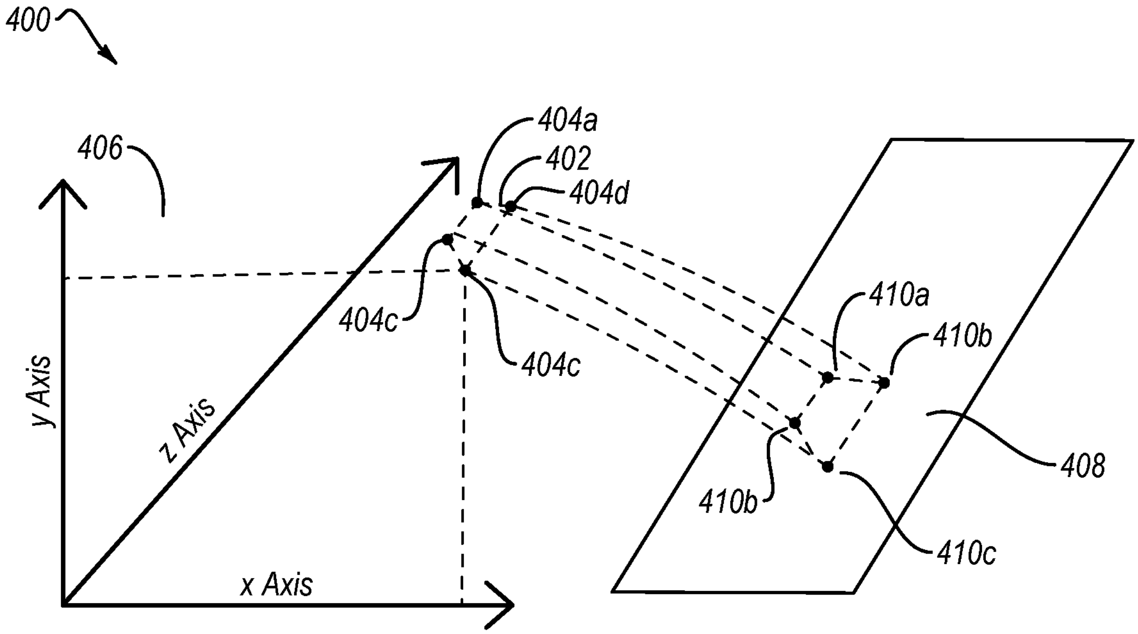
FIG. 4 is a schematic representation of the mapping of an object in a three-dimensional space to a two-dimensional space, according to one or more examples of the present disclosure.

Extrinsic parameter optimizer system 102 converts the generated three-dimensional keypoints to a two-dimensional space at block 310 of method 300. An example of mapping three-dimensional keypoints to a two-dimensional space is shown in FIG. 4, which is a perspective view illustrating a mapping of an object in a three-dimensional space to a two-dimensional space, according to one or more examples of the present disclosure. View 400 of FIG. 4, shows keypoints 404*a-d* of three-dimensional object 402 in three-dimensional space 406. Object 402 is mapped onto two-dimensional plane 408. Keypoints 404*a-d* in three-dimensional space 406 correspond to keypoints 410*a-d* in two-dimensional plane 408. In other words, keypoint 410*a* is a point on two-dimensional plane 408 within two-dimensional space that corresponds to keypoint 404*a* of three-dimensional object 402. Similarly, keypoints 410*b*, 410*c*, and 410*d* are points on two-dimensional plane 408 that correspond to keypoints 404*b*, 404*c*, and 404*d* of three-dimensional object 402.

Conversion of three-dimensional keypoints to two-dimensional keypoints in a two-dimensional space also uses extrinsic parameters associated with image-based pose estimation system 100, and intrinsic parameters of camera system 104. Extrinsic parameters include the position offset of image capture device 208 relative to mounting location 210, as well as an orientation offset between image capture device 208 and mounting location 210. Intrinsic parameters include, but are not limited to, focal length, field of view, pixel resolution, etc. of image capture device 208. Initially, extrinsic parameter optimizer system 102 may use an initial value of extrinsic parameters, which is based on the design offset and not the actual offset. Extrinsic parameters are needed because they provide a frame of reference for projecting the three-dimensional object, such as the keypoints to a two-dimensional plane. If there is a slight variation in the frame of reference, there will be a corresponding variation in the projection to the two-dimensional plane. Therefore, it can be important to ensure that the extrinsic parameters are accurate and optimized. Similarly, a variation in intrinsic parameters may also introduce error. In certain examples, image-based pose estimation system 100 includes an intrinsic parameter optimizer system.

A number of factors may cause a variation between the design offset and the actual offset. By utilizing method 300, extrinsic parameter optimizer system 102 is able to accurately determine the actual offset, thereby optimizing the extrinsic parameters. Reasons for the variation include there being a wide tolerance during manufacture and assembly of refueling boom 206 and image capture device 208. Even if tolerances are tight, a slight variation may cause inaccurate estimation of three-dimensional keypoints. Further, variation may be introduced during operation and service of the equipment. Since aircraft are subject to a wide range of pressure, temperature and forces, there tends to be considerable wear and subsequent service required to maintain the equipment. Further, in some examples, image capture device 208 may be able to pan and tilt, thereby changing the default orientation.

Figure 5A:
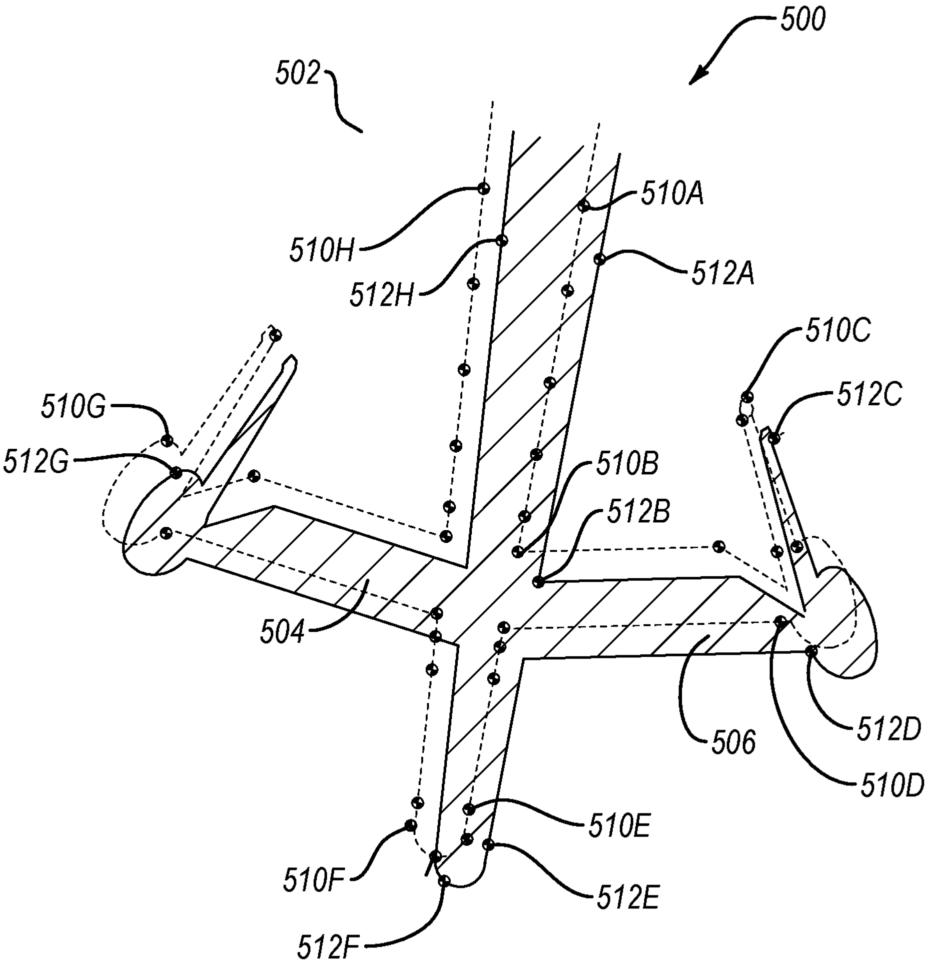
FIG. 5A is a two-dimensional image showing variation between generated two-dimensional keypoints and estimated position of the keypoints of a refueling boom of an aircraft, according to one or more examples of the present disclosure.

At block 312 of method 300, extrinsic parameter optimizer system 102 determines a feedback value. In certain examples, the feedback value is a value that represents a delta variation between the generated two-dimensional keypoints at block 310 of method 300, and estimated two-dimensional keypoint coordinates determined by neural network system 108. In certain examples, the feedback value is a value that represents a delta variation between the generated two-dimensional keypoints at block 310 of method 300, and actual keypoint location in a two-dimensional image captured by image capture device 208. As seen in FIG. 5A, a variation between the generated two-dimensional keypoints and estimated position of keypoints of refueling boom 206 of an aircraft is identified by extrinsic parameter optimizer system 102, according to one or more examples of the present disclosure. The variation, or feedback value, is used to adjust the extrinsic parameters, at block 314 of method 300. FIG. 5A shows two-dimensional keypoints 510*a-h* that are generated by extrinsic parameter optimizer system 102 from the three-dimensional keypoints. Also seen in FIG. 5A is the location 506 of refueling boom 206. The offset between the actual location of keypoints 512*a-h* and generated two-dimensional keypoints 510*a-h* is due to the extrinsic parameters not be optimized (representing a difference between the initial offset of image capture device 208 and mounting location 210 and the actual offset). In certain examples, neural network system 108 estimates two-dimensional keypoint coordinates using captured images from image capture device 208. In one example, neural network system 108 is identifies difference in color in greyscale or black and white images where whiter pixels represent higher likelihood that the keypoint is in that 2d pixel. For this task, neural network system 108 is trained on black and white images and the training task is to identify the outline or edge of an object based on color difference of pixels.

An iterative process, that repeatedly executes blocks 312, 314, and 316 of method 300 is used to minimize the feedback value. In some examples, an objective function is used to iteratively calculate the feedback value and adjust extrinsic parameters, until the feedback value is minimized below a threshold. In certain examples, the iterative process is executed for a designated number of iterations. In one example, the feedback value is the sum of the distance between the generated two-dimensional keypoint co-ordinates and estimated two-dimensional keypoint coordinates determined by neural network system 108, summed for all keypoints.

In one example, an iterative process executes block 316 of method 300, whereby processor 114 generates a second set of predicted 2D keypoints based at least in part on the at least one updated extrinsic parameter. Processor 114 also compares the second set of predicted 2D keypoints and the 2D image to update the feedback value at block 316 of method 300.

Figure 5B:
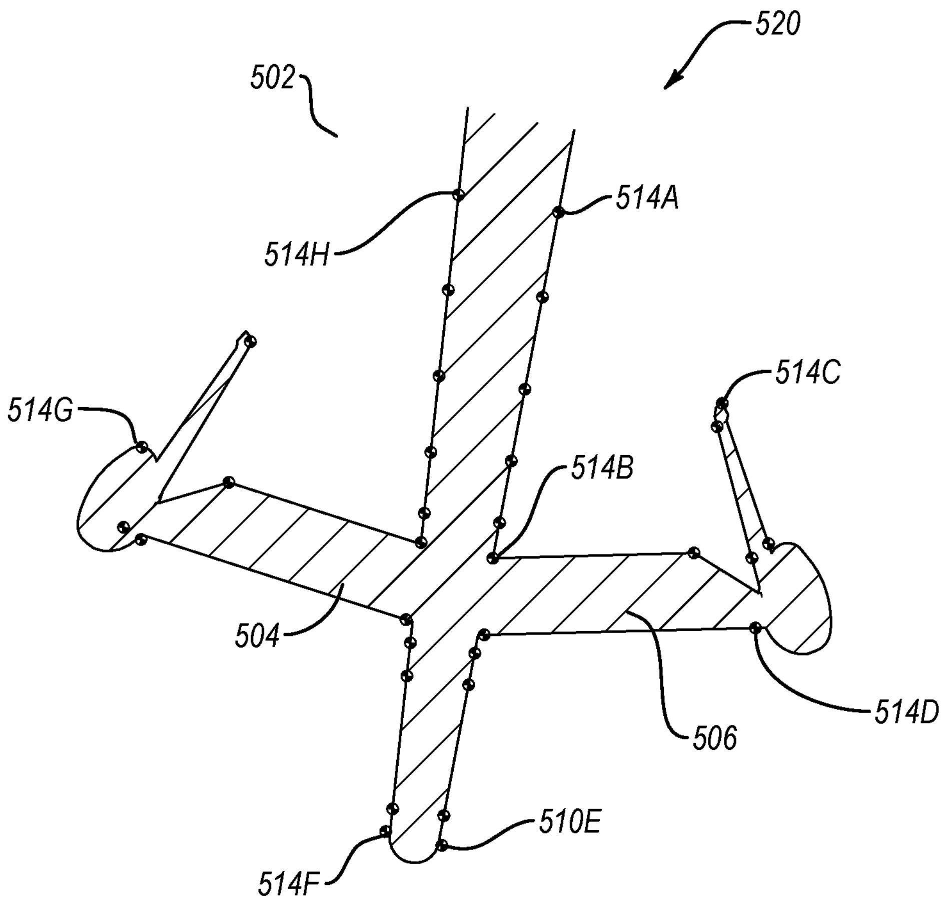
FIG. 5B is a two-dimensional image showing a reduced variation between generated two-dimensional keypoints and estimated position of the keypoints of a refueling boom of an aircraft based on extrinsic parameter optimization used in image-based pose estimation, according to one or more examples of the present disclosure.

At block 318 of method 300, optimized extrinsic parameters are obtained and used to generate two-dimensional keypoints. For example, FIG. 5B shows a two-dimensional image 520, within an environment 502, showing a reduced variation between the generated two-dimensional keypoints and estimated position of keypoints of refueling boom 206, according to one or more examples of the present disclosure. Two-dimensional keypoints 514*a-h* generated using the optimized extrinsic parameters overlap with keypoints determined from neural network system 108. This results in an overlap between the estimated three-dimensional model of refueling boom 206 projected in two-dimensional plane and the location of refueling boom 206 determined by neural network system 108. The refueling boom 206 can include a left side elevator 504 and a right side elevator506.

At block 320 of method 300, in certain examples, image-based pose estimation system 100 uses the optimized extrinsic parameters to determine the three-dimensional model of refueling boom 206 in real-time based on obtained positional and rotational information of refueling boom 206. In certain examples, image-based pose estimation system 100 uses the optimized extrinsic parameters to determine the three-dimensional model of refueling boom 206 in real-time based on images captured from image capture device 208 that are used to generate a generate a three-dimensional model using neural network system 108.

In certain examples, neural network system 108 can estimate the control parameters of refueling boom 206, such as position and rotational information based on two-dimensional keypoint estimates, the boom kinematic model, camera intrinsic parameters and camera extrinsic parameters. An iterative process, using an objective function that optimizes the extrinsic parameters, is employed to reduce the error between sensor readings of control parameters and the estimated control parameters. Once the control parameters are estimated, a least squares fit is used to optimize over the most likely set of input control parameters. From there a Kalman filter is used to help smooth the results. This allows for more constrained boom estimation and temporal tracking. In various examples, a method uses boom kinematics with multiple components to build an optimization objective that is a function of the boom control parameters. In various embodiments, the optimization uses the fact that the boom is fixed at a certain point and removes any additional degrees of freedom that arise if the boom fixed point were unconstrained. The angle(s) of the movable components are estimated in space via the optimization and used to compute a refinement. This refinement in accuracy follows from accounting for the full kinematic model. The full model allows more keypoints—particularly those on the movable components to be considered and allows analytical jacobian based optimization methods to be used.

In certain examples, image-based pose estimation system 100 leveraged more than a single image frame. Using many frames averages out 2D keypoint estimation variations such as small pixel noise, lighting differences, or fine neural network approximation inaccuracies.

Further, multiple frames can be used that vary the boom control parameters and pose, which allows for reduced bias induced by any particular geometric view. In a runtime setting, the use of multi-frame data also smooths noise from sensor readings of control parameters.

Multi-frame data may be explicitly included in multiple ways. In a first example, data from all captured frames is used to calculate the objective function and is then averaged over all values to construct a single objective function. This can be applied only to an offline setting, where two-dimension keypoints are obtained by human annotation. In a second example, extrinsic parameters are estimated separately for all frames and later averaged. In certain examples, a rolling average may be used to aggregate the extrinsic parameter estimates from a stream of images in a video feed.

As referenced herein, the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention.

In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A vision-based optimization apparatus, comprising:
a camera fixed relative to an object;
at least one processor; and
a memory device storing instructions, which, when executed by the at least one processor, cause the at least one processor to, at least:
receive a two-dimensional (2D) image of at least a portion of the object via the camera;
generate 3D keypoints using a 3D model of the object and known rotational and translational information of the object;
generate predicted 2D keypoints based at least in part on the generated 3D keypoints and at least one initial extrinsic camera parameter;
compare the predicted 2D keypoints and the 2D image to generate a feedback value, wherein the feedback value represents a reprojection error between the predicted 2D keypoints and observed 2D keypoints in the 2D image; and
based on the feedback value, update the at least one initial extrinsic camera parameter to generate an at least one updated initial extrinsic camera parameter by updating at least one of a positional offset and an angular offset between the camera and the object.

2. The apparatus of claim 1, wherein the instructions further cause the at least one processor to:
generate a second set of predicted 2D keypoints based at least in part on the at least one updated extrinsic camera parameter;
compare the second set of predicted 2D keypoints and the 2D image to update the feedback value; and
based on the updated feedback value, update the at least one updated initial extrinsic camera parameter.

3. The apparatus of claim 1, further comprising a boom control system, wherein the instructions cause the at least one processor to receive the known rotational and translational information of the object from the boom control system.

4. The apparatus of claim 1, wherein the instructions further cause the at least one processor to utilize a neural network system to generate the predicted 2D keypoints.

5. The apparatus of claim 1, wherein the at least one initial extrinsic camera parameter comprises of at least one of:
an offset of the camera along an x-axis relative to a first setpoint;
an offset of the camera along a y-axis relative to the first setpoint;
an offset of the camera along a z-axis relative to the first setpoint;
a pitch offset of the camera relative to the first setpoint;
a yaw offset of the camera relative to the first setpoint; and
a roll offset of the camera relative to the first setpoint.

6. The apparatus of claim 5, wherein the object comprises a refueling boom of an aircraft.

7. The apparatus of claim 6, wherein the at least one initial extrinsic camera parameter comprises an estimated offset between the camera and the first setpoint, and wherein the first setpoint is an estimated location of the camera on the aircraft.

8. A computer implemented method of optimizing a vision- based system to control an object, the method comprising:
receiving a two-dimensional (2D) image of at least a portion of the object via a camera;
generating a 3D model of the object;
generating 3D keypoints using the 3D model of the object;
generating predicted 2D keypoints based at least in part on the generated 3D keypoints and at least one initial extrinsic camera parameter;
determining a feedback value, based at least in part on a comparison of the predicted 2D keypoints and the 2D image, wherein the feedback value represents a reprojection error between the predicted 2D keypoints and observed 2D keypoints in the 2D image to generate a feedback value;
using an optimizer to minimize the feedback value and to generate a minimized feedback value; and
obtaining at least one optimized extrinsic camera parameter based on the minimized feedback value by updating at least one of a positional offset and an angular offset between the camera and the object.

9. The computer implemented method of claim 8, wherein generating the predicted 2D keypoints is based at least in part on the generated 3D keypoints and at least one initial extrinsic camera parameter is generated by a neural network system.

10. The computer implemented method of claim 9, further comprising training the neural network system based at least in part on:
image data from camera, and
the 3D model of the object, based at least in part on obtained position and rotational information the object.

11. The computer implemented method of claim 8, further comprising obtaining position and rotational information of the object, wherein generating the 3D model of the object is based at least in part on the obtained position, rotational, and joint angle information.

12. The computer implemented method of claim 8, wherein:
using the optimizer to minimize the feedback value further comprises using an objective function, based at least in part on the feedback value and the at least one initial extrinsic camera parameter and iteratively using the optimizer to minimize the feedback value; and
as the feedback value is reduced, the at least one initial extrinsic camera parameter is optimized.

13. The computer implemented method of claim 12, further comprising using the at least one optimized extrinsic camera parameter as input to determine a plurality of 3D keypoints of the object based on a second two-dimensional (2D) image of at least a portion of the object.

14. The computer implemented method of claim 8, wherein the at least one initial extrinsic camera parameter comprises of at least one of:
an offset of the camera along an x-axis relative to a first setpoint;
an offset of the camera along a y-axis relative to the first setpoint;
an offset of the camera along a z-axis relative to the first setpoint;
a pitch offset of the camera relative to the first setpoint;
a yaw offset of the camera relative to the first setpoint; and
a roll offset of the camera relative to the first setpoint.

15. The computer implemented method of claim 8, wherein the object comprises a refueling boom of an aircraft.

16. A non-transitory computer-readable medium storing instructions, which when executed by a processor, cause the processor to:

receive a two-dimensional (2D) image of at least a portion of an object via a camera;

generate a 3D model of the object;

generate 3D keypoints using the 3D model of the object;

generate predicted 2D keypoints based at least in part on the generated 3D keypoints and at least one initial extrinsic camera parameter;

determine a feedback value, based at least in part on a comparison of the predicted 2D keypoints and the 2D image, wherein the feedback value represents a reprojection error between the predicted 2D keypoints and observed 2D keypoints in the 2D image;

use an optimizer to minimize the feedback value and to generate a minimized feedback value; and obtain at least one optimized extrinsic camera parameter based on the minimized feedback value by updating at least one of a positional offset and an angular offset between the camera and the object.

17. The non-transitory computer-readable medium of claim 16, wherein the instructions further cause the processor to utilize a neural network system to generate the predicted 2D keypoints.

18. The non-transitory computer-readable medium of claim 17, wherein the instructions further cause the processor to train the neural network system based at least in part on:

image data from camera, and the 3D model of the object, based at least in part on obtained positional, rotational, and joint angle information the object.

19. The non-transitory computer-readable medium of claim 16, wherein the instructions further cause the processor to obtain position and rotational information of the object, and wherein generating the 3D model of the object is based at least in part on the obtained position and rotational information.

20. The non-transitory computer-readable medium of claim 16, wherein:

using the optimizer to minimize the feedback value further comprises using an objective function, based at least in part on the feedback value and the at least one initial extrinsic camera parameter and iteratively using the optimizer to minimize the feedback value; and as the feedback value is reduced, the at least one initial extrinsic camera parameter is optimized.

* * * * *